United States Patent Office 3,563,821
Patented Feb. 16, 1971

3,563,821
METHOD OF MANUFACTURING A STAINED GLASS WINDOW
Henriette M. Turtaud, La Reunion: 13 Cite Ah-Soune, Saint-Denis, France
No Drawing. Filed Jan. 18, 1967, Ser. No. 610,020
Claims priority, application France, Jan. 21, 1966, 46,760
Int. Cl. B44c 3/12; B44f 1/06; C03c 27/04
U.S. Cl. 156—63                              2 Claims

ABSTRACT OF THE DISCLOSURE

A stained glass window constructed as a lamination of a glass sheet and a sheet of plastic with the stained glass pieces arranged in the desired pattern on the plastic sheet prior to heating.

BACKGROUND OF THE INVENTION

Many types of stained glass have been known for a long time and almost all of them are highly fragile. Some are rather sturdy but this strength is usually achieved at the expense of a certain esthetic quality and, at any rate, to the detriment of a reasonable production cost figure. Attempts have been made for quite some time to remedy this fragility of stained glass windows by using a type of stained glass window constructed with the help of concrete and glass.

This kind of stained glass window, however, is cumbersome and falls far short of featuring the esthetic characteristics we find in fine but lightweight stained glass.

It is the purpose of this invention to offer a new type of stained glass window which will be outstanding for its constitution, resistance (strength), esthetic effects, and particularly low production cost.

Another object of this invention resides in the production method which makes it possible to obtain new types of stained glass at a rather low cost, inspite of the improved qualities of this new product.

SUMMARY OF THE INVENTION

A method for making stained glass windows comprising:

(a) Assembling a plurality of stained glass pieces on a support comprising at least one sheet of glass and a sheet of thermoplastic material with the stained glass pieces superimposed on said plastic sheet, (b) Arranging a plurality of filler fragments in the spaces between said stained glass pieces, (c) Heating the assembly to a temperature sufficient to adhere said pieces, said fragments and said glass sheet to said thermoplastic sheet.

(d) Cooling the assembly, and (e) Filling any remaining interstices between said pieces and said fragments with a mortar.

A stained glass window assembly which is made in accordance with the above method.

According to this invention, the colored or stained glass pieces which make up the selected design after assembly, rest on a support. This support is made up of an assembly of glass sheets and sheets of polyvinyl butyral, for example, with one sheet of polyvinyl butyral disposed adjacent the assembly of stained glass pieces.

The stained glass pieces are separated from each other by larger or smaller intervals containing fragments of coral.

The size of the fragments used may vary as a function of the thickness of the stained glass and as a function of the size of the intervals between the stained glass pieces. By way of example, the diameter of a fragment, which might be cylindrical in shape, generally does not exceed two or three times the thickness of the stained glass, while the orientation of the fragments preferably runs in the direction of the interval between two glass plates when separated by a narrow interval. The fragments may be randomly oriented in the portions where the interval is wide and irregular.

The assembly is then subjected to a heat treatment. After heat treatment and in order to produce the smoothest appearance possible, the interstices, which may be left in the intervals containing the coral fragments, are filled with a cement mortar.

This gives us stained glass with a prettier effect, remarkable strength, and a particularly low production cost. According to this invention, this kind of stained glass is obtained by the following process.

An assembly of glass sheets and polyvinyl butyral sheets, for example, is put together in the following manner:

2.5-mm. glass sheet
1-mm. butyral sheet
3.5-mm. glass sheet
1-mm. butyral sheet

This assembly is placed on a table provided with a peripheral retaining wall consisting, for instance, of angle-irons which rest on a thick glass plate. This glass is illuminated from below so that one can easily follow and compose the design (pattern) selected.

After the stained glass pieces have been assembled on the polyvinyl butyral sheet, the intervals between stained glass pieces are filled with coral fragments having a specific size, as we have just explained above; this size being a function of the thickness of the stained glass. In the example picked here, this glass is 2.5-mm. thick.

After assembly, the entire sandwich is put in a suitable kiln, more specifically, into a press of the type described in the French Pat. No. 1,417,196 for a "Safety Glass Production Press." Applicant is the holder of that patent.

After baking at around 140° C., as in the example given here, followed by cooling, the last interstices, that might be left among the coral fragments incorporated between the stained glass pieces, are filled with a cement mortar.

After drying, polishing, cleaning and levelling of the peripheral retaining wall for the stained glass window, we get a product with marked esthetic features and remarkable strength at a low production cost.

This strength is derived from the laminated construction achieved here. The coral fragments cling to the polyvinyl butyral sheet and this clinging effect is further reinforced by the cement which is intended to level off the intervals, although uneven spots remain due to the presence of certain fragments in the pattern. This provides a stained glass window with exceptional shock resistance.

It is obvious that we would still be within the scope of this invention if we were to select a glass sheet covered by a polyvinyl butyral sheet and if we were to replace the coral fragments with various products of a similar nature, either stained or not stained. Thus we might replace the coral with certain types of ground, colored limestone and we might even provide pieces of colored plastic material between the stained glass pieces, particular those plastics that are of the same nature of polyvinyl butyral.

We might also apply pressure on the sandwich made up of glass sheets and incorporated coral fragments. This pressure could be applied by means of any suitable body which would conform to all of the portions during baking, or we might work in two phases, one for the application of the stained glass and the other for the application of the coral fragments.

If we want to cover the two faces of the supporting surface with stained glass, we proceed as just described, placing the stained glass on the polyvinyl butyral sheets situated on either side of a support consisting of a sheet of glass or a glass sheet sandwich.

Alternatively, we might proceed as follows: on the transparent working table, we put a first sheet of transparent glass on which we arrange the stained glass pieces of the first face. Then we apply the above-mentioned materials between the stained glass pieces according to the desired design. Coral might even be replaced by metallic platelets or baguettes, colored pins or ribbons, made of anodized aluminum, for instance. We then put a glass sheet sandwich, whose two faces consist of polyvinyl butyral sheets, on this first design; then we arrange the stained glass pieces for the second face according to the design selected, which design may be different from the design formed by the assembly of colored glass on the first face.

The heat treatment might involve heating to 140° C. at a pressure of something like 4–6 kg. per square meter. This heat treatment does not alter the anodized aluminum in any way.

We would still be within the scope of this invention if we were to make the various operating phases automatic, that is, these phases would be controlled by a thermostat and by a cutoff timer, suitably regulated as a function of the desired stained glass window characteristics.

It is also contemplated that other type of thermoplastic sheet material having characteristics similar to polyvinyl butyral could be used in the assembly.

Obviously many modifications and variations of the present invention are possible in the light of the above teachings. It is therefore understood that within the scope of the appended claims, the invention may be practiced otherwise than as specifically disclosed.

What is claimed is:

1. A method for making stained glass windows comprising:
    (a) assembling a plurality of stained glass pieces of irregular configuration on a support comprising at least one sheet of glass and a sheet of thermoplastic material with the stained glass pieces superimposed on said plastic sheet,
    (b) arranging a plurality of filler fragments in the spaces between said stained glass pieces,
    (c) heating the assembly to a temperature sufficient to cause said thermoplastic sheet to adhere said pieces and said fragments to said glass sheet,
    (d) cooling the assembly, and
    (e) filling any remaining interstices between said pieces and said fragments with a mortar.

2. A method as set forth in claim 1 further comprising supporting said support over a light source during the assembling of said stained glass pieces to facilitate the composition of the design.

References Cited
UNITED STATES PATENTS

| | | | |
|---|---|---|---|
| 504,506 | 9/1893 | Verhaghen | 161—5 |
| 763,064 | 6/1904 | Mercer | 161—37 |
| 1,813,901 | 7/1931 | Bayne | 156—63 |
| 3,247,046 | 4/1966 | Fazekas | 161—5 |
| 3,420,730 | 1/1969 | Ellefson | 161—3X |
| 2,279,145 | 4/1942 | Ryan | 161—199 |

JOHN T. GOOLKASIAN, Primary Examiner

R. A. KILLWORTH, Assistant Examiner

U.S. Cl. X.R.

156—100, 106, 297, 299; 161—5, 6, 162, 199, 408